(12) United States Patent
Liverud et al.

(10) Patent No.: US 8,778,159 B2
(45) Date of Patent: Jul. 15, 2014

(54) SEPARATOR APPARATUS FOR SEPARATING OIL AND WATER

(75) Inventors: Jon Liverud, Oslo (NO); Arne Myrvang Gulbraar, Sofirmyr (NO); Simon Davies, Naersnes (NO)

(73) Assignee: Marks & Clerk, Toronto (CA)

( * ) Notice: Subject to any disclaimer, the term of this patent is extended or adjusted under 35 U.S.C. 154(b) by 1775 days.

(21) Appl. No.: 11/662,009

(22) PCT Filed: Sep. 9, 2005

(86) PCT No.: PCT/IB2005/003263
§ 371 (c)(1),
(2), (4) Date: Aug. 2, 2007

(87) PCT Pub. No.: WO2006/027697
PCT Pub. Date: Mar. 16, 2006

(65) Prior Publication Data
US 2008/0116072 A1    May 22, 2008

(30) Foreign Application Priority Data
Sep. 9, 2004 (GB) .................................. 0419994.9

(51) Int. Cl.
*C10G 33/02* (2006.01)
*B01D 17/028* (2006.01)

(52) U.S. Cl.
USPC ............................. 204/563; 204/660; 210/521

(58) Field of Classification Search
None
See application file for complete search history.

(56) References Cited

U.S. PATENT DOCUMENTS

| 3,267,998 A | 8/1966 | Simpson |
| 4,904,412 A * | 2/1990 | Schugerl et al. ............... 516/69 |
| 2003/0159986 A1 * | 8/2003 | Amado et al. ............... 210/521 |

FOREIGN PATENT DOCUMENTS

| EP | 1082168 | 11/2004 |
| WO | WO-1992/019347 | 11/1992 |
| WO | WO-1992/019349 | 11/1992 |
| WO | WO-2003/039706 | 5/2003 |
| WO | WO-2004/007908 | 1/2004 |

OTHER PUBLICATIONS

International Search Report and Written Opinion for PCT/IB2005/003263, dated Jan. 23, 2006.

* cited by examiner

*Primary Examiner* — Krishnan S Menon
*Assistant Examiner* — Michelle Adams
(74) *Attorney, Agent, or Firm* — Goodwin Procter LLP

(57) ABSTRACT

A method of separating oil and water in a flow-stream through a gravity settling vessel (10) in which the flow-stream (12) separates into a lower water layer (22) and an upper oil layer (26), includes feeding an off-take stream (34) of the oil layer and/or an emulsion layer (20) that forms between the oil layer and the water layer through a compact electrostatic coalescer (CEC) (38) that has electrically isolated electrodes. The CEC coalesces water droplets in the off-take stream, and the coalesced off-take stream is then returned to the settling vessel. An associated separator apparatus for comprises: a gravity settling vessel (10); a CEC (38) including electrically isolated electrodes; a coalescer feed line (34) configured to provide an off-take stream of an oil phase and/or an emulsion layer from the settling vessel to the CEC; and a return line (40) from the CEC for returning the off-take stream to the settling vessel.

11 Claims, 4 Drawing Sheets

US 8,778,159 B2

SEPARATOR APPARATUS FOR SEPARATING OIL AND WATER

CROSS-REFERENCE TO RELATED APPLICATIONS

This application is a national stage of, claims priority to and the benefit of, and incorporates herein by reference in its entirety International (PCT) Patent Application No. PCT/IB2005/003263, which was filed on Sep. 9, 2005 and which claimed priority to and the benefit of Great Briton Patent Application No. 0419994.9, filed on Sep. 9, 2004 and also incorporated herein by reference in its entirety.

BACKGROUND OF THE INVENTION

The present invention relates to a method and apparatus for improving the performance of a separator. More particularly the invention relates to a method and apparatus for improving the performance of a separator used for separating crude oil and water in oil production well-streams.

The production well-stream from an oil well may contain a mixture of oil and water (and may also include gases, solids and other fluids). The water may arise naturally, or may be a result of water (e.g. seawater) pumped into the well to raise the pressure and force more oil out. Separation of the various constituents is an important part of the processing, which it is desirable to carry out as soon as possible before the crude oil is stored or transported for further processing. Although oil and water are immiscible liquids, separation is particularly problematic when the water is carried in the form of small droplets in a continuous oil phase. In some situations the oil and water form an emulsion of very small water droplets dispersed throughout the oil.

Most separation processes include a settling vessel in which oil and water phases separate under gravity, with the heavier water falling to form a water layer below a lighter oil layer.

The gravity separation process requires a sufficient residence time in the settling vessel for the water droplets to sink to the water layer. The effectiveness of the separation depends not only on the residence time but also on the nature of the oil and water mixture entering the vessel. In many situations, an emulsion layer forms at the interface between the oil and water layers. The emulsion layer (also known as a rag layer) tends to inhibit the separation and prevent water droplets sinking into the water layer. Furthermore, in these situations the emulsion layer tends to build up over time, further retarding the separation process and reducing the volume of oil and water layers in the settling vessel.

It is known to reduce the problem of a build-up of the emulsion layer by removing a portion of this layer through an outlet provided at an appropriate position on the settling vessel. This may be done periodically in a batch operation after the emulsion layer has been allowed to build up for a time. The emulsion removed may be taken away for treatment or disposal.

WO 92/19347 and WO 92/19349 describe processes in which a stream is taken from the emulsion layer in a separating vessel and fed into and oil-water hydrocyclone separator before being returned to the separating vessel inlet. A hydrocyclone may be effective in aiding separation of oil droplets from a water-continuous emulsion, but has a problem in that it is only effective over a limited range of oil/water proportions. Also hydrocyclones are not effective in separating water droplets in oil-continuous emulsions. Another problem with using a hydrocyclone is that although some degree of separation and coalesecence of droplets may be achieved, much of this is destroyed at the outlet where the shear forces tend to remix the liquid phases.

Even when there is little or no emulsion layer between the oil and water layers, the size of the settling vessel is limited by practical or economic constraints such that the fluids have insufficient residence time in the vessel for the smallest water droplets to drop out of the oil.

It is an aim of the present invention to provide a method and apparatus for improving separator performance so as to alleviate the aforementioned problems.

BRIEF SUMMARY OF THE INVENTION

According to a first aspect of the present invention there is provided a method of separating oil and water in a flow-stream through a gravity settling vessel in which the flow-stream separates into a lower water layer and an upper oil layer, the method including feeding an off-take stream of said oil layer and/or an emulsion layer that forms between the oil layer and the water layer through a compact electrostatic coalescer (CEC) having electrically isolated electrodes, so as to coalesce water droplets in the off-take stream, and then returning the coalesced off-take stream to the settling vessel.

According to a second aspect of the present invention there is provided a separator apparatus for separating oil and water in a flow-stream, comprising:
a gravity settling vessel;
a compact electrostatic coalescer (CEC) including electrically isolated electrodes;
a coalescer feed line configured to provide an off-take stream of an oil phase and/or an emulsion layer from the settling vessel to the CEC; and
a return line from the CEC for returning the off-take stream to the settling vessel.

The coalescer feed line and/or the return line may be provided to/from respective end locations within the settling vessel. Preferably, the coalescer feed line and/or the return line are provided, at their respective end locations, with one or more orifices at a level inside the settling vessel where fluid treatment is required.

A CEC is described in European Patent No. 1082168. The CEC provides significant advantages leading to an improvement in the separation performance. A CEC is effective in coalescing droplets in emulsions for a wide range of oil/water proportions. These include the oil/water proportions that are often found to be the most difficult to separate effectively using gravity separation. When the off-take is taken from the oil phase, particularly the oil phase at or near an oil outlet of the settling vessel, the water droplets are very small. The CEC coalesces such small droplets, and allows a stream containing much larger coalesced droplets to be fed back into the settling vessel. The larger droplets settle quickly into the water phase and thereby enhance the separation process. When the off-take includes a large proportion of emulsion taken from the emulsion layer, the water content may be very high (e.g. 50% or more). Other known types of electrostatic coalescers cannot be used with such high water contents because the water conducts electricity to short-circuit the electrodes or to cause electric arcing. The CEC does not suffer from these problems because it uses electrically isolated electrodes. The compact design of the CEC makes it particularly suitable in off-shore or sub-sea processing due to the relatively small size and weight of the equipment.

In one embodiment, the settling vessel has an oil outlet for providing a flow of separated crude oil from the settling vessel and the off-take is taken from the oil outlet. Preferably, the off-take stream, after being fed through the CEC is returned to the settling vessel at or close to a flow-stream inlet of the settling vessel. More preferably, the off-take is returned into the oil phase in the settling vessel. Alternatively, an off-take outlet may be provided on the settling vessel whereby the off-take stream is taken from the oil phase in the settling vessel.

In another embodiment, an off-take outlet is provided on the settling vessel whereby the off-take stream is taken from an emulsion layer. Preferably, the off-take stream, after passing through the CEC, is returned to the settling vessel into either the emulsion layer or into the oil phase. The off-take outlet may be provided at a position close to a flow-stream inlet of the settling vessel. The off-take is preferably returned to the settling vessel at a location close to, but a short distance downstream of the off-take outlet.

As stated above, an advantage of the CEC when compared with other known electrostatic coalescers is that it can operate to coalesce water droplets even when the water content is high. Consequently, the water droplets in the emulsion layer can be coalesced into larger droplets. This assists both in breaking down the emulsion and in separating the water from the oil phase. Also, by returning the off-take stream with the coalesced water droplets back to the settling vessel at a position that is only a short distance downstream of the off-take outlet, there is a minimal effect on the overall residence time of the flow stream in the settling vessel (when compared, for example, with systems that recycle the off-take back to the inlet of the settling vessel where the effect of recycling is to reduce the residence time). If the emulsion contains a relatively small water fraction, then the CEC may be effective in completely breaking it down. In that case, the off-take stream can be returned to the oil phase in the settling vessel so that the coalesced water droplets can sink to the water phase. On the other hand, if the emulsion layer cannot be completely broken down by the CEC, it is preferable to return the off-take stream back into the emulsion layer in the settling vessel. The coalesced water droplets will sink out of the emulsion into the water phase and as a consequence the thickness of the emulsion layer is reduced.

In another alternative embodiment, a blockage plate is provided in the settling vessel to provide a blockage to part of the flow stream, the off-take stream being taken from one side, preferably upstream, of the blockage plate and returned to the other side. Preferably, the blockage plate provides a blockage to flow of the emulsion layer through the settling vessel. It is an advantage that by blocking the flow of the emulsion layer part of the way through the vessel the emulsion layer may be eliminated altogether beyond the blockage. This reduces the total volume of emulsion inside the vessel, and leaves more of the vessel volume available for gravity separation of water from the oil layer.

Alternatively, or additionally, the blockage plate may provide a blockage to flow of the oil phase. Conveniently, the height of the blockage plate is adjustable so that the blockage to the emulsion layer can be maintained even if the level of the emulsion layer changes.

The blockage plate may be provided as a blockage to the oil layer, the off-take stream being taken from the oil layer upstream of the blockage plate and returned to the oil layer downstream of the blockage plate. The oil layer may have an upper surface level in the settling vessel that is higher at the upstream side of the blockage and lower at the downstream side. Advantageously, the difference in the oil layer surface levels provides a hydraulic head that assists in forcing the oil layer off-take stream through the CEC.

Alternatively, the blockage plate may be an integral part of a distributor plate, extending partly or completely across the cross sectional area of the settling vessel.

Where the off-take stream is taken from the settling vessel, the off-take outlet may comprise a height-adjustable orifice so that the level at which the off-take stream is taken from the settling vessel can be altered. Additionally, where the off-take stream is returned directly to the settling vessel, a height-adjustable inlet may be provided so that the level at which the off-take stream is returned to the settling vessel can be altered.

It is an advantage that the provision of a fixed or height-adjustable blockage plate, inlet or outlet requires relatively few modifications to the design of an existing settling vessel. Consequently, the apparatus is particularly suitable for retro-fitting to an existing separator.

Another advantage arises when apparatus according to the present invention is used in a subsea installation. In such installations the settling vessel should not be provided with internal equipment that requires maintenance. However, periodically it is necessary to recover equipment such as a CEC for maintenance. This can be done by simply closing the off-take stream (e.g. by way of isolation valves) and isolating the CEC without interrupting the flow stream from the well. The settling vessel can operate in a conventional manner without the off-take (albeit with a reduced performance) while the CEC is being overhauled.

BRIEF DESCRIPTION OF THE DRAWINGS

Embodiments of the invention will now be described with reference to the following drawings.

DETAILED DESCRIPTION OF THE INVENTION

Figure 1:
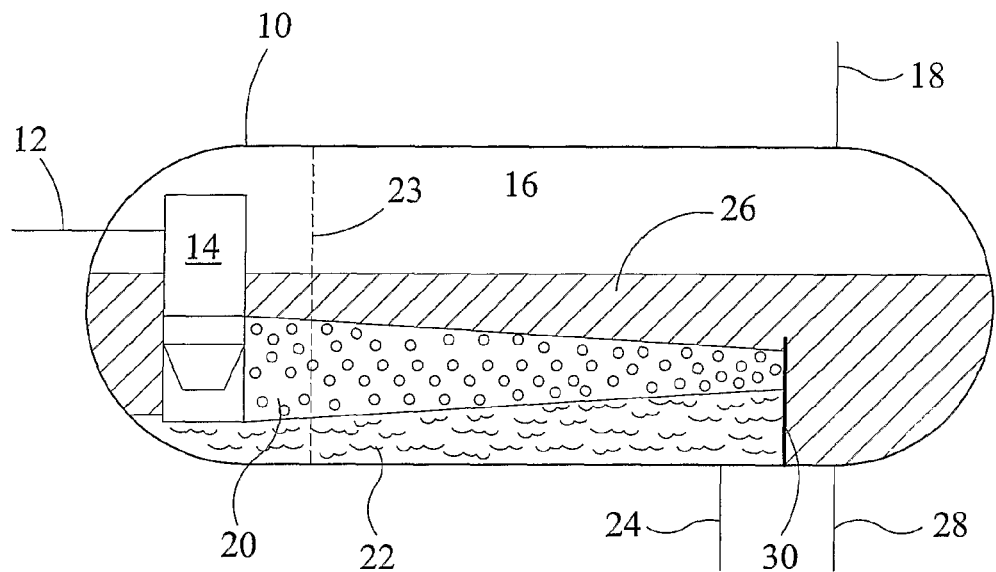
FIG. 1 is a sectional illustration of a known arrangement of settling vessel.

Referring to FIG. 1, a gravity settling vessel 10 has an inlet 12 for receiving a well-stream. The well stream includes crude oil, water and gas. The well-stream is fed to an inlet cyclone 14 which separates the gas from the other constituents. The gas enters a space 16 at the top of the settling vessel 10 and leaves the vessel by way of a gas outlet 18. The oil and water leave the inlet cyclone 14 as a mixture 20. The mixture 20 most often consists of water in the form of droplets carried by a continuous oil phase. Provided the water droplets are large enough they fall under gravity to the bottom the settling vessel 10 to form a water layer 22. The mixture 20 forms a region or layer between the water layer 22 and an oil layer 26. The oil layer 26 is predominantly crude oil, but contains small droplets of water.

The water layer 22, oil layer 26, and the mixture 22 move away from the inlet cyclone 14. A distributor plate 23 helps to distribute the flow over the whole of the cross-sectional area of the settling vessel 10. The water layer 22 moves towards a water outlet 24 at or near the bottom of the settling vessel 10.

The oil layer 26 moves towards an oil outlet 28, also located at or near the bottom of the vessel. A baffle 30 extends upwardly from the bottom of the settling vessel 10 between the water outlet 24 and the oil outlet 28. The baffle 30 extends high enough to completely block any further flow of the water layer 22, or the mixture 20, but does not extend high enough to prevent the oil layer 26 flowing past the top of the baffle 30.

The settling vessel will continue to perform effectively as a gravity separator as long as the consistency of the mixture 20 is such that the water droplets are large enough to fall down to the water layer 22, and the settling vessel 10 is large enough for the mixture 20 to have sufficient residence time in the vessel for this to occur. In these conditions the mixture 20 gradually separates so that the region or layer of the mixture becomes thinner as the fluids flow through the settling vessel 10. Note that FIG. 1 depicts the mixture 20 as a distinct layer having a definite interface between the mixture 20 and the oil layer 26. In reality there is unlikely to be such a definite interface. Instead there is a more gradual change in the spatial density and size of water droplets moving down from the oil layer 26 to the mixture 20.

It is not practicable to provide a long enough residence time for gravitational forces to separate very small droplets from the oil. Consequently the oil layer 26 will still contain very small water droplets, which are carried in the oil leaving through the oil outlet 28.

Figure 2:
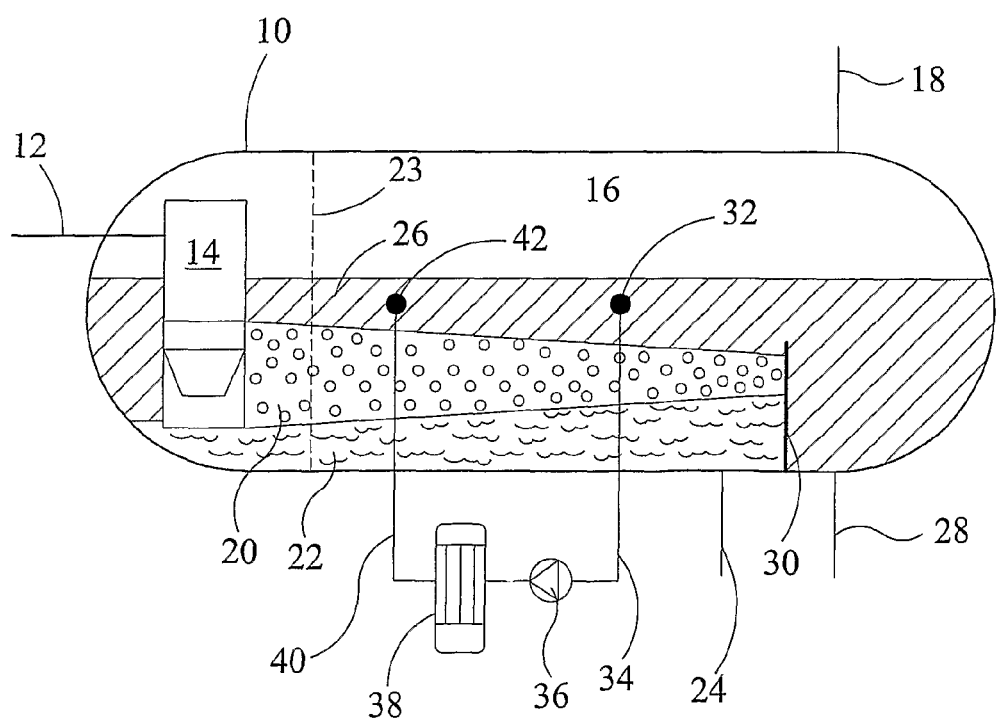
FIG. 2 shows the settling vessel of FIG. 1 incorporating an improvement according to a first embodiment.

Referring to FIG. 2, the settling vessel 10 is provided with an off-take outlet 32 for taking an off-take stream from the oil layer 26. A pump 36 pumps the off-take stream through a feed line 34 to a compact electrostatic coalescer (CEC) 38. The off-take stream passes through the CEC 38 and is returned to the settling vessel 10 by way of a return line 40 and a return inlet 42. The return inlet 42 is situated upstream of the off-take outlet 32.

The CEC 38 is an electrostatic coalescer having particular characteristics. As its name implies, the CEC 38 is a compact device with small overall dimensions, making it particularly suitable for installation where space is at a premium (such as on off-shore oil platforms). Another feature of the CEC is that the electrodes are electrically isolated. This means that a mixture having a high water content can be fed through a CEC, which will continue to operate to coalesce the water droplets without the risk of short-circuiting the electrodes. The CEC can even be fed with pure water without short-circuiting.

In use, the oil layer 26 at the position of the off-take outlet 32 will contain very small water droplets (as discussed above). The CEC 38 provides an effective means for coalescing even these very small droplets so that the water droplets in the return line 40 are much larger. The oil containing these coalesced droplets is returned to the oil layer 26 at the return inlet 42. Because the droplets are much larger than those taken out in the off-take stream, they will settle much more quickly. In this way the separation of water from the oil can be enhanced.

Figure 3:
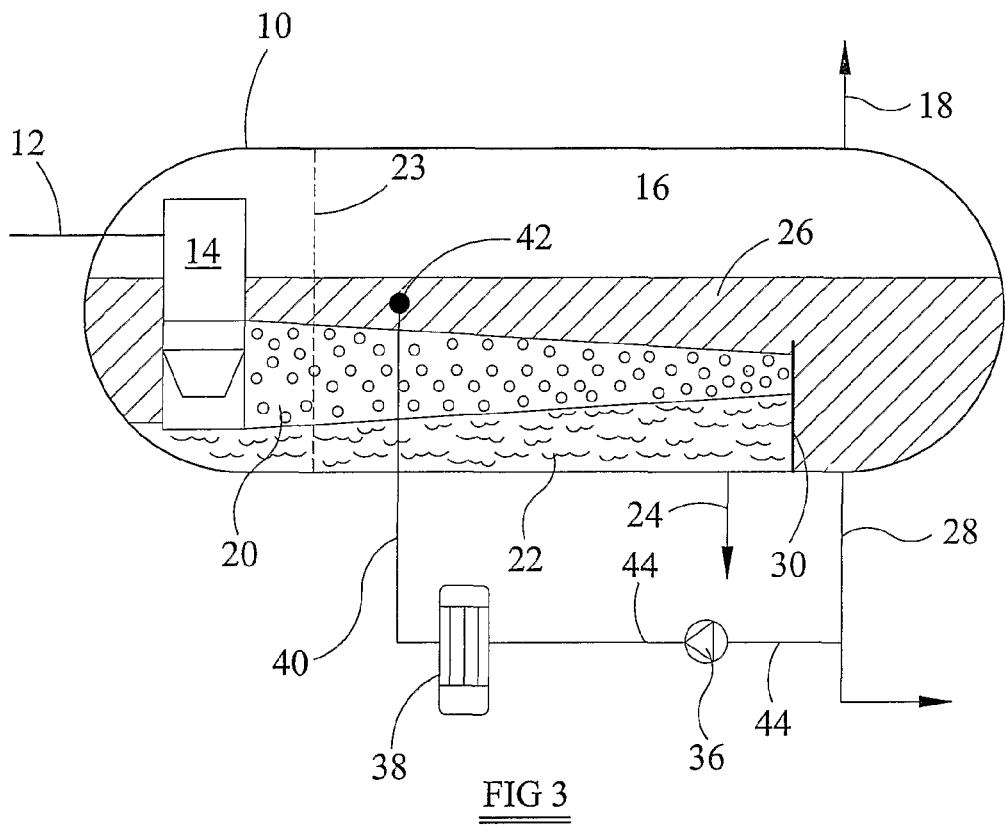
FIG. 3 shows the settling vessel of FIG. 1 incorporating an improvement according to a second embodiment.

Referring to FIG. 3, an alternative arrangement to that shown in FIG. 2, instead of taking the off-take stream from the oil layer 26 in the settling vessel 10, an off-take line 44 is taken from the oil outlet 28. An off-take stream is pumped through the off-take line 44 to the CEC 38. This ensures that only the very smallest droplets, which would otherwise be carried with the oil from the settling vessel 10, are fed through the CEC 38.

A further problem with gravity separators, as depicted in FIG. 1, arises when the composition of the well-stream fluids is such that the water and the oil in the mixture 20 form a stable emulsion. An emulsion inhibits the gravity separation process so that the mixture 20 tends to become thicker instead of thinner as it moves through the settling vessel 10. The emulsion layer builds up over time, with the result that less oil and water are separated, and less of the volume of the settling vessel 10 is taken up by the oil and water layers. This results in deterioration of separator performance (i.e. more water is carried over with the oil, or the throughput has to be reduced to give the required quality of separation).

Coalescing of the water droplets in the emulsion is an effective way of helping to break it down and improve separation. The water content in an oil and water emulsion is considerably higher than, for example, that of the oil layer 26 in the settling vessel 10 of FIG. 1. In most known designs of electrostatic coalescer the high water content would cause short-circuiting of the electrodes, resulting in failure or damage to the coalescer. However, this problem does not arise with the electrically isolated electrodes used in the CEC. Thus one possibility is to use an arrangement similar to that shown in FIG. 2, but with the off-take outlet 32 situated at a level on the settling vessel to extract emulsion from the mixture layer 20. The off-take could be returned to the settling vessel either into the oil layer 26 (the position shown in FIG. 2), or into the mixture layer 20.

Figure 4:
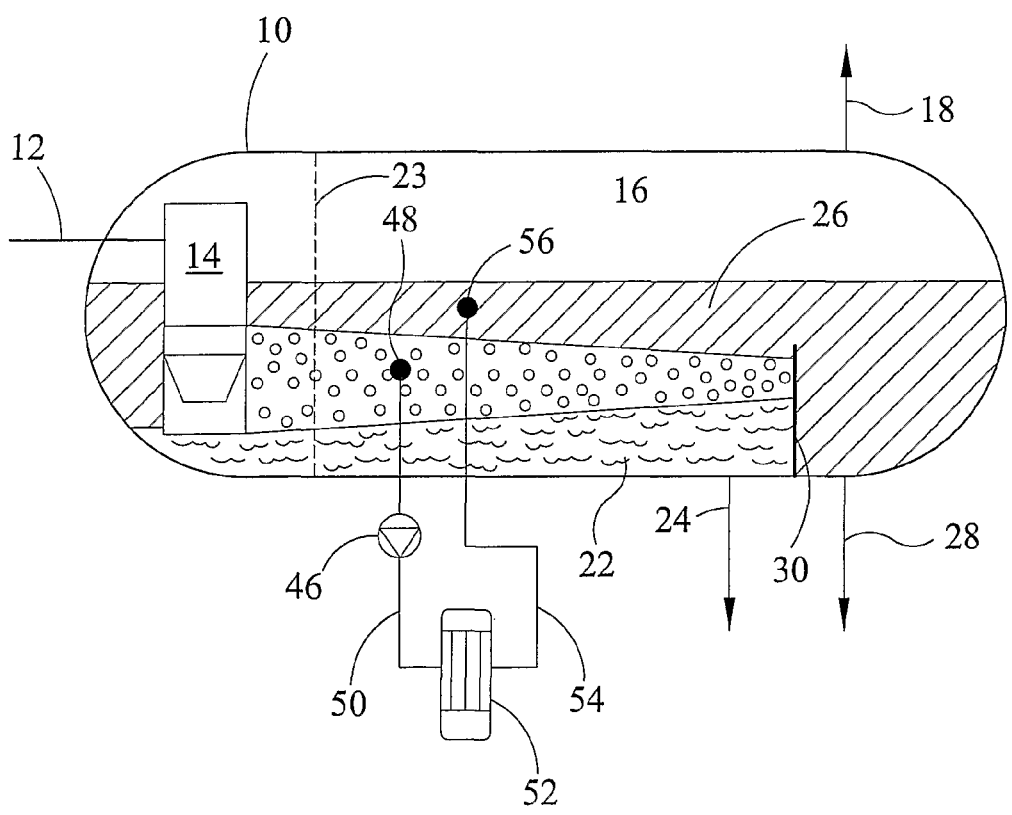
FIG. 4 shows the settling vessel of FIG. 1 incorporating an improvement according to a third embodiment.

Referring to FIG. 4, in another alternative arrangement, an off-take stream is removed from the settling vessel 10 by means of a pump 46 extracting emulsion from the mixture layer 20 through an off-take outlet 48. The off-take stream is fed through an off-take line 50 to a CEC 52 and returned via a return line 54 to the settling vessel 10 at an off-take return inlet 56. The off-take return inlet 56 is located a short distance downstream of the off-take outlet 48. As shown in FIG. 4, the off-take stream is returned to the oil layer 26. However, depending on the extent to which the emulsion is broken down in the CEC 52, it may be more effective for the off-take to be returned to the mixture layer 20.

An advantage of the arrangement shown in FIG. 4 is that there is no effect on the residence time in the settling vessel 10. With a recycled off-take stream, such as that shown in FIGS. 2 and 3, the residence time in the vessel is reduced (i.e. the velocity of the flow of oil and water through the settling vessel 10 is increased). This is not a problem if the water droplets are coalesced by the CEC so that they are large enough to fall out of the oil layer in the reduced residence time. However, especially where the CEC is used to help break down an emulsion, there may still be a need to provide a long residence time for the water droplets to fall out of the oil.

Figure 5:
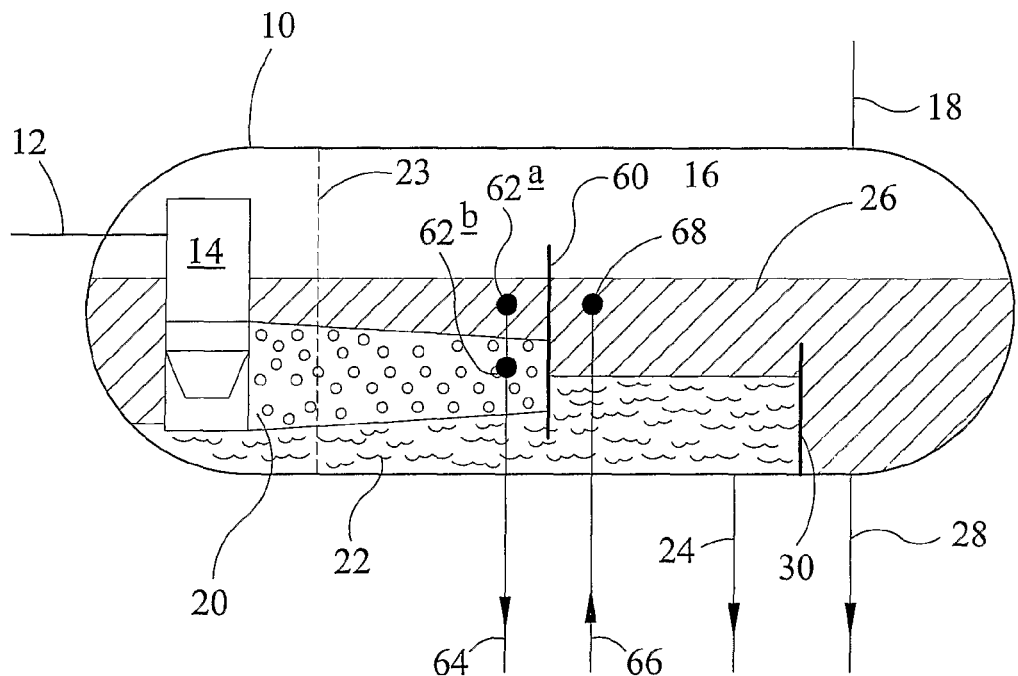
FIGS. 5a and 5b show the settling vessel of FIG. 1 incorporating two alternative arrangements of an improvement according to a fourth embodiment.
Figure 5:
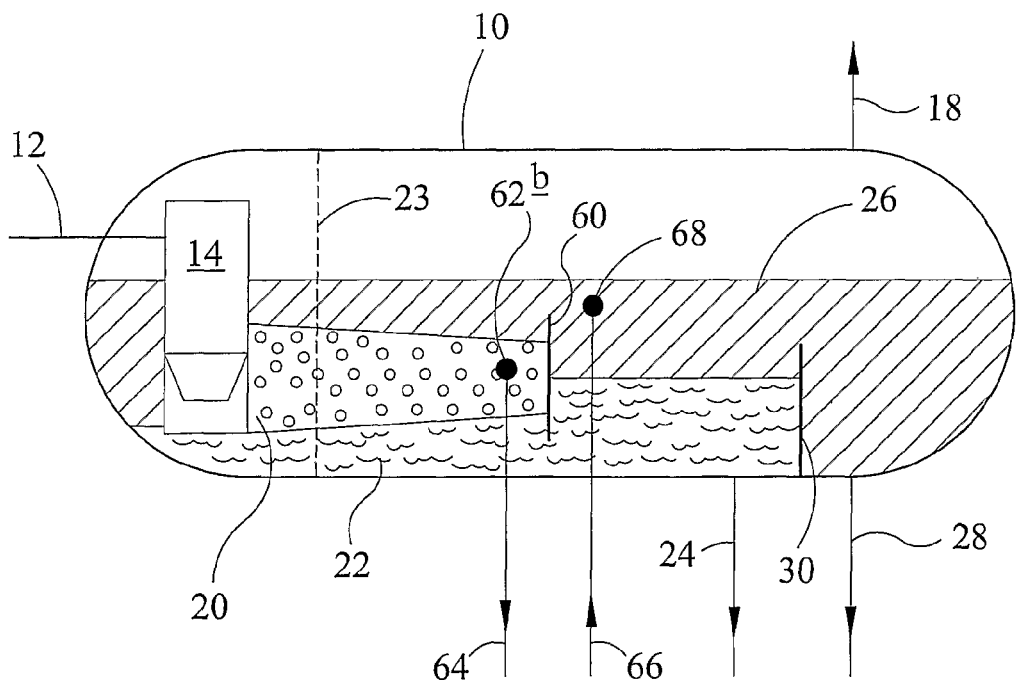

Referring to FIG. 5a, a blockage plate 60 is provided in the settling vessel 10. An off-take stream is taken from upstream of the blockage plate 60 from an off-take outlet 62a in the oil layer 26. An additional off-take outlet 62b may be positioned at a lower level so as to take a proportion of the off-take from the mixture layer 20. The off-take stream is fed through an off-take line 64 to a CEC (not shown) and returned through a return line 66 to a return inlet 68 downstream of the blockage plate 60. Where the mixture layer 20 is an emulsion layer, the CEC acts to break down the emulsion by coalescing the water into large droplets. After the off-take is returned to the settling vessel 10 downstream of the blockage plate 60 there is no longer an emulsion layer to inhibit the separation of water droplets from the oil. The blockage plate 60 therefore acts as a stop to limit the horizontal extent of the emulsion layer.

In the arrangement shown in FIG. 5a the blockage plate 60 extends to above the oil layer 26. This means that all of the oil that has separated into the oil layer upstream of the blockage plate 60 is taken through the CEC. The arrangement shown in FIG. 5b is the same as FIG. 5a, except that the blockage plate 60 does not extend above the oil layer 26. This means that oil that has separated upstream can continue to flow past the blockage plate 60 and only emulsion from the mixture layer 20 is taken through the CEC.

Figure 6:
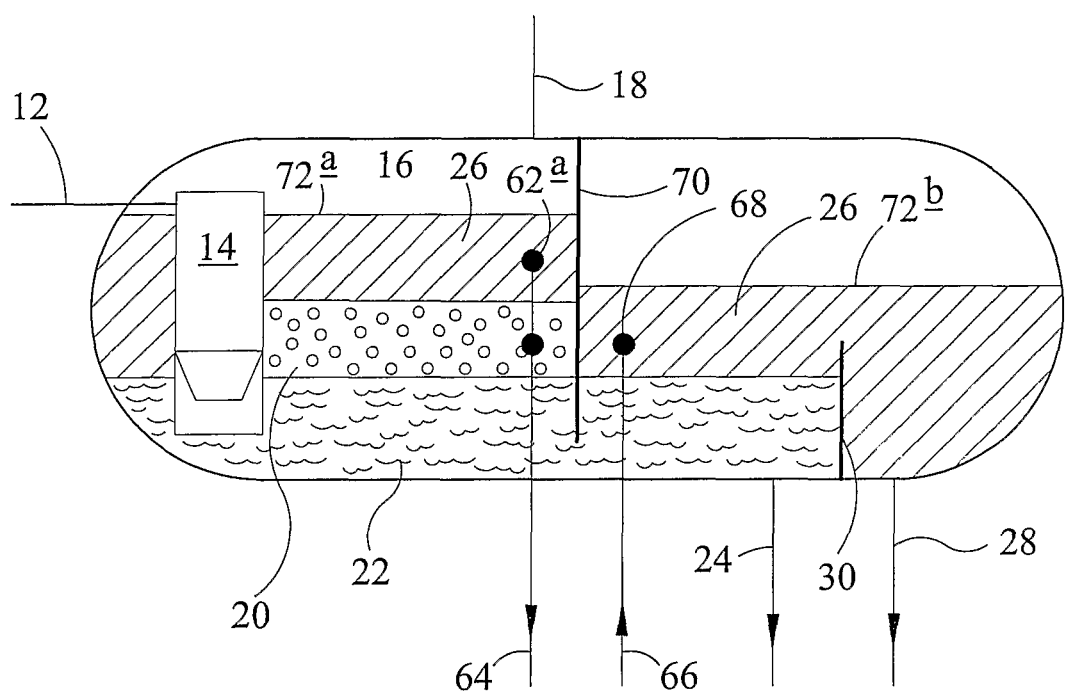
FIG. 6 shows a settling vessel similar to that shown in FIG. 1 incorporating an improvement according to a fifth embodiment.

Referring to FIG. 6, a blockage plate 70 extends downwards from the top of the settling vessel 10 to a level below the oil layer 26 and the mixture layer 20. As in the embodiment shown in FIG. 5a, an off-take stream is taken from outlets 62a, 62b upstream of the blockage plate 70, fed through a CEC (not shown) and returned to the settling vessel 10 downstream of the blockage plate 70. In this case the upper surface level 72a of the oil is higher on the upstream side of the blockage plate 70 with the upper surface level 72b being lower on the downstream side. The difference in the levels provides a hydraulic head, which assists in forcing the oil off-take stream through the CEC.

In the embodiments shown in FIGS. 2 to 6, the only modifications required to be made to the settling vessel 10 of FIG. 1 are the provision of one or more off-take outlets, a return inlet and, in some embodiments, a blockage plate. These are relatively straightforward modifications that can be retrofitted to existing settling vessels. In addition, because the constituents of the well-stream can change over time, this may place different demands on the manner in which the separation process is operated. For example, the extent to which the oil and water form an emulsion may change over time. To allow for this the off-take outlets, return inlet and blockage plates may be configured to be adjustable so that the off-take stream can be taken from or returned to a different level in the vessel when conditions demand. The off-take outlets and/or the return inlet may utilise a height-adjustable orifice for this purpose.

Periodically it is necessary to carry out maintenance on the CEC and ancillary equipment such as pumps etc. Because these items of equipment are installed in an off-take stream, it is possible to isolate them by closing valves situated in the off-take and return lines. Isolating the CEC and ancillary equipment in this way enables maintenance to be carried out without interrupting the flow stream from the well. The settling vessel can operate in a conventional manner without the off-take (albeit with a reduced performance) while the CEC is being overhauled. Routine maintenance includes cleaning the CEC to flush away accumulated hydrocarbons. Because the CEC is compact this takes much less time than for other comparable equipment.

The method and apparatus described above enable existing separators to operate more effectively, and in some cases will enable them to process an increased throughput (which can be useful, for example, when a new production stream is being tied in to existing processing equipment). Where new separators are being installed, these can be designed with smaller settling vessels (for equivalent throughput) and have a wider operating range so that they are effective for most, or all of the life of a well.

The invention claimed is:

1. A separator apparatus for separating oil and water in a flow-stream from an oil well, comprising:
    a gravity settling vessel in which the flow-stream separates into a lower water layer and an upper oil layer, the gravity settling vessel including a flow-stream inlet;
    a compact electrostatic coalescer (CEC) including electrically isolated electrodes, for coalescing water droplets;
    a coalescer feed line, having a first orifice within the settling vessel, wherein the first orifice is configured to provide an off-take stream from an emulsion layer formed between the upper oil layer and the lower water layer, the off-take stream being taken from the settling vessel to the CEC;
    a return line from the CEC to the settling vessel, for returning the off-take stream;
    wherein the first orifice of the coalescer feed line is provided at a position downstream from the flow-stream inlet of the settling vessel, and an orifice of the return line is located in the settling vessel downstream from said first orifice;
    a first blockage plate extending upwardly from a bottom of the settling vessel high enough to substantially block any further flow of the lower water layer and the emulsion layer, but not preventing the upper oil layer from flowing past said first blocking plate; and
    a second blockage plate in the settling vessel upstream of the first blockage plate to provide a blockage to part the flow-stream, wherein the first orifice of the coalescer feed line is located at one side of the second blockage plate and the orifice of the return line is located at another side of the second blockage plate;
    wherein said second blockage plate does not extend to above the oil layer and provides a blockage to a flow of the emulsion layer through the settling vessel.

2. The separator apparatus of claim 1, wherein the settling vessel has an oil outlet for providing a flow of separated crude oil from the settling vessel and the oil outlet is in fluidic communication with the coalescer feed line.

3. The separator apparatus of claim 2, wherein the oil outlet is arranged downstream the first blockage plate.

4. The separator apparatus of claim 1, wherein the return line is configured with an orifice to the upper oil layer to return the off-take stream into the upper oil layer in the settling vessel.

5. The separator apparatus of claim 1, wherein the return line is arranged for returning the off-take stream, after passing through the CEC, to the settling vessel into the upper oil layer.

6. The separator apparatus of claim 1, wherein a height of the second blockage plate is adjustable so that the blockage to a flow of the emulsion layer can be maintained even if a level of the emulsion layer changes.

7. The separator apparatus of claim 1, wherein the second blockage plate is an integral part of a distributor plate that extends partly or completely across a cross sectional area of the settling vessel.

8. The separator apparatus of claim 1, wherein the first orifice of the coalescer feed line is height-adjustable.

9. The separator apparatus of claim 1, wherein the off-take stream is returned directly to the settling vessel, a height-adjustable inlet being provided so that the level at which the off-take stream is returned to the settling vessel can be altered.

10. The separator apparatus of claim 1, wherein the first orifice of the coalescer feed line is configured to provide a first portion of the off-take stream from said emulsion layer, wherein the coalescer feed line has a second orifice within the settling vessel, wherein the second orifice is configured to provide, simultaneously with the first portion, a second portion of the off-take stream from the upper oil layer, the first and second portions being taken from the settling vessel to the CEC.

11. The separator apparatus of claim 10, wherein the first orifice and the second orifice of the coalescer feed line are arranged upstream the second blockage plate.

* * * * *